Sept. 29, 1959  J. E. SOCKE  2,906,239
CAN BODY SIDE SEAM COOLING AND SPRAYING APPARATUS
Filed Sept. 27, 1956  4 Sheets-Sheet 1

INVENTOR.
JOHN E. SOCKE
BY Charles H. Erne
Leland R. McCann
George W. Reiber
ATTORNEYS

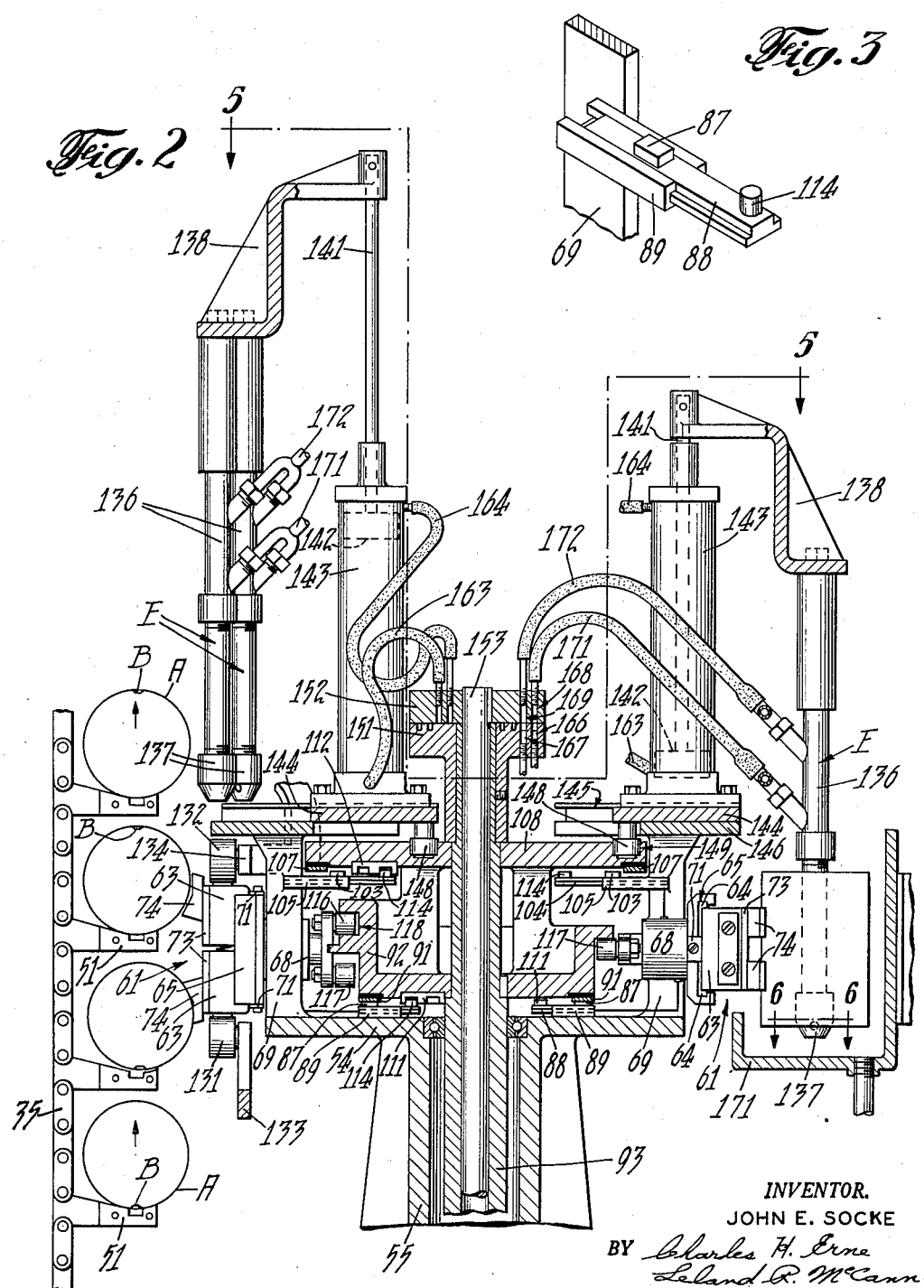

Sept. 29, 1959     J. E. SOCKE     2,906,239
CAN BODY SIDE SEAM COOLING AND SPRAYING APPARATUS
Filed Sept. 27, 1956     4 Sheets-Sheet 3

INVENTOR.
JOHN E. SOCKE
BY Charles H. Erne
Leland R. McCann
George W. Reiber
ATTORNEYS Sept. 29, 1959 J. E. SOCKE 2,906,239
CAN BODY SIDE SEAM COOLING AND SPRAYING APPARATUS
Filed Sept. 27, 1956 4 Sheets-Sheet 4
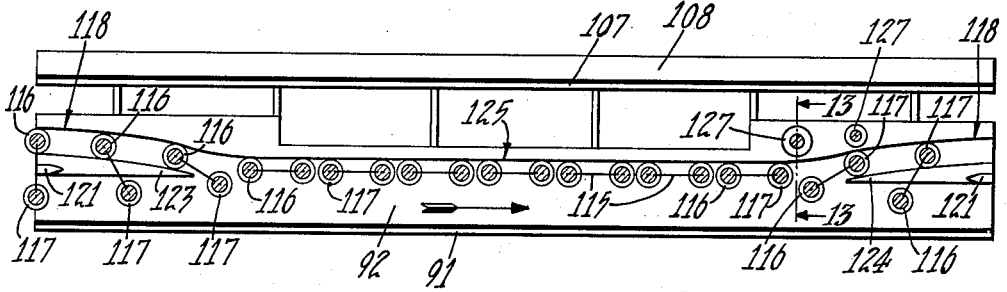
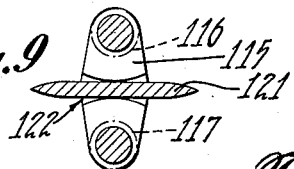
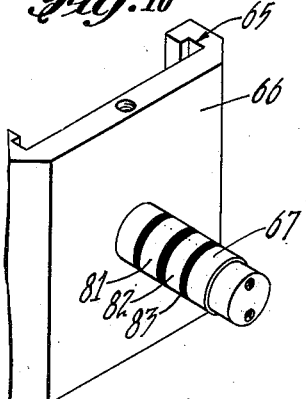
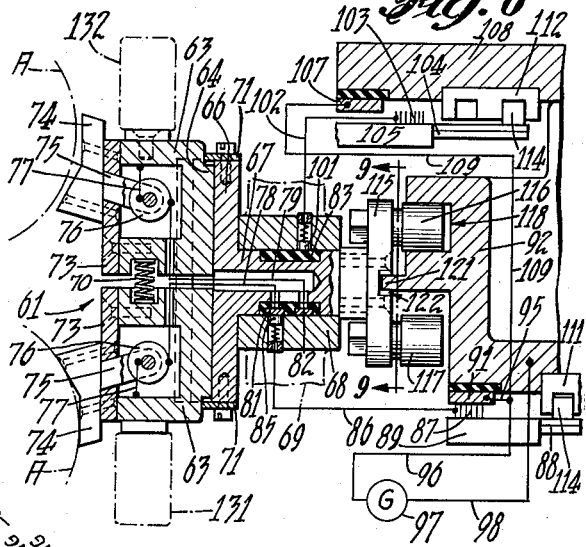
INVENTOR.
JOHN E. SOCKE
BY Charles H. Erne
Leland R. McCann
George W. Reiber
ATTORNEYS United States Patent Office 2,906,239
Patented Sept. 29, 1959

2,906,239

CAN BODY SIDE SEAM COOLING AND SPRAYING APPARATUS

John E. Socke, Pelham Manor, N.Y., assignor to American Can Company, New York, N.Y., a corporation of New Jersey Application September 27, 1956, Serial No. 612,515

13 Claims. (Cl. 118—316)

The present invention relates to apparatus for making can bodies and the like articles and has particular reference to devices for cooling and spraying freshly soldered side seams of can bodies as an incident in the manufacture of the bodies.

In the manufacture of sheet metal can or container bodies made from tin plate, black iron and the like materials, the bodies preferably are made from flat blanks which are bent into tubular form and which have side seam marginal edge portions which are permanently united in lap or lock and lap side seams. After formation of the side seams, they are heated and soldered and sometimes are also sprayed with an atomized fluid coating substance to protect them against corrosion. Solder baths utilized for soldering the side seams usually are maintained at a temperature of approximately 600 to 800 degrees Fahrenheit so that the cans are too hot for immediate handling and must be cooled prior to subsequent operations.

An object of the instant invention is the provision of an apparatus for cooling and spraying the freshly soldered side seams, the apparatus being designed to occupy a minimum of floor space in contrast to the long cooling and spraying mechanisms now in use.

Another object is the provision of such an apparatus which picks the can bodies off a moving line for spraying and returns them again to the line for further advancement without in any manner interrupting the continuous travel of the bodies during their cooling operation.

Another object is the provision of such an apparatus which turns the can bodies end-over-end through an angle of 180 degrees so as to position the sprayed side seams in an advantageous location for drying of the coating substance on the seams.

Another object is to provide a continuous operation apparatus which cools and coats the side seams simultaneously.

Numerous other objects and advantages of the invention will be apparent as it is better understood from the following description, which, taken in connection with the accompanying drawings, discloses a preferred embodiment thereof.

Fig. 2 is an enlarged sectional view of the spraying section of the apparatus shown in Fig. 1, with parts broken away;

Fig. 3 is an enlarged perspective view of a detail shown in Fig. 2, with parts broken away;

Fig. 7 is a developed schematic view of a cam shown in Fig. 2;

Fig. 8 is an enlarged fragmentary sectional view of can body carrier parts of the spraying section of the apparatus shown in Fig. 2, the view including a wiring diagram of electrical parts in the apparatus;

Fig. 9 is a sectional view taken substantially along the line 9—9 in Fig. 8;

Figs. 10 and 11 are enlarged perspective views of detailed parts shown in Fig. 8, with a portion of Fig. 10 being broken away;

Fig. 12 is an enlarged top plan view of a valve mechanism shown in Fig. 2, with portions broken away; and Fig. 13 is an enlarged fragmentary sectional view taken substantially along the line 13—13 in Fig. 7.

Figure 1:
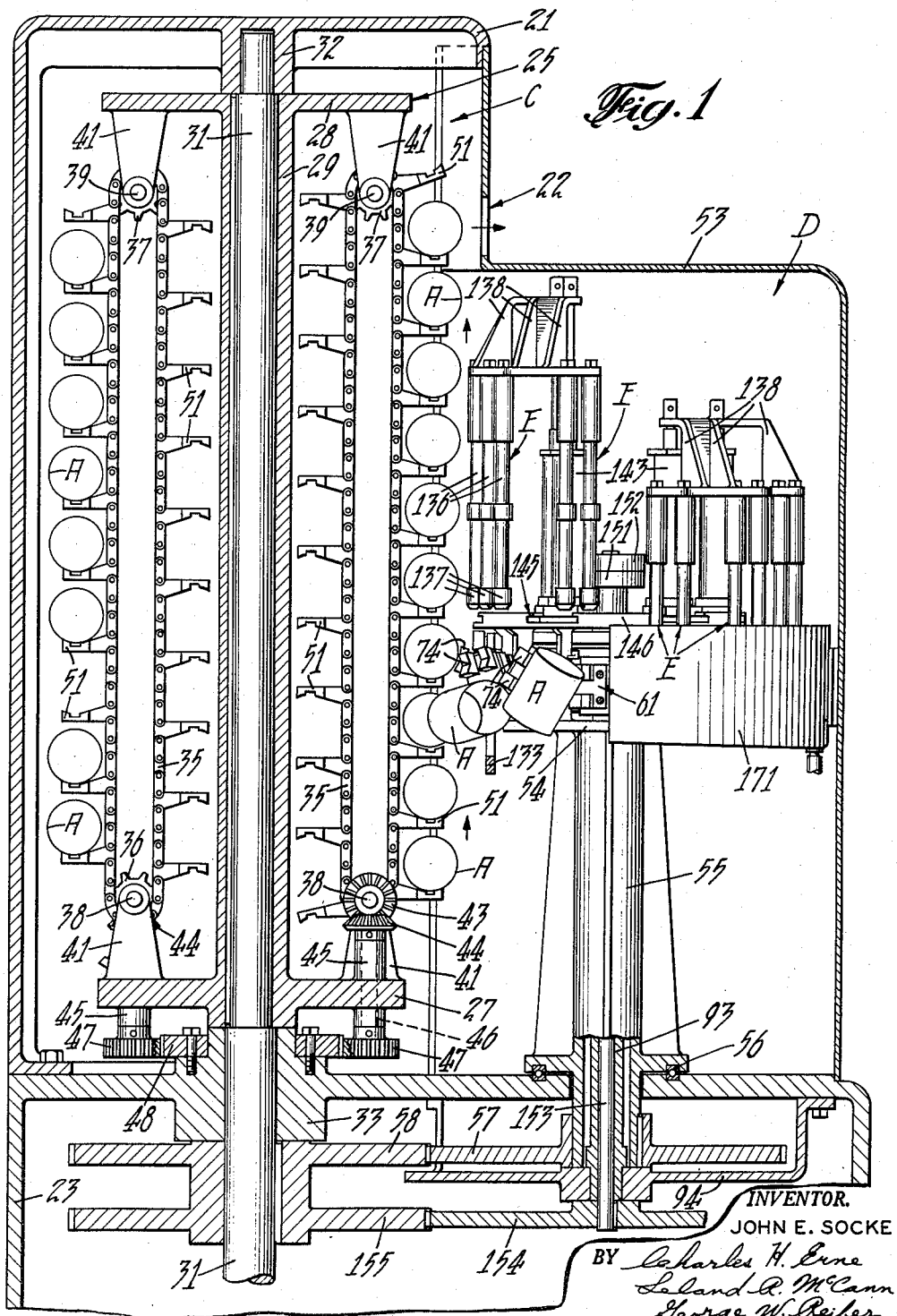
Figure 1 is a sectional view of a can body side seam cooling and spraying apparatus embodying the instant invention; with parts broken away.

As a preferred or exemplary embodiment of the instant invention the drawings illustrate a can body side seam cooling and spraying apparatus in which sheet metal can bodies A (Figs. 1, 2, 5 and 6) having freshly soldered side seams B are received and conveyed through a vertical cooling chamber C (Fig. 1) to reduce their temperature for subsequent handling. During their passage through the cooling chamber C, the can bodies A are individually picked out of their vertical line of travel and conveyed along a horizontal circular path of travel through an auxiliary cooling chamber D which is an offset and connected portion of the main cooling chamber C.

During their travel along this circular path of travel in the auxiliary cooling chamber D, the can bodies A are rotated endwise into a spraying position and the side seams B on the inside and the outside of the bodies are sprayed with an atomized fluid coating substance preferably applied by pairs of spray heads E which straddle the side walls of the bodies and are moved along the length of the side seams.

Upon completion of the spraying operation the can bodies A are further turned endwise so as to position the bodies with the sprayed side seams on top in an advantageous drying location. The bodies in this position are returned to the main cooling chamber C to continue their travel through this chamber.

During all this travel, the bodies are being cooled, even while being sprayed so that the cooling and the spraying are effected simultaneously and substantially in the same space.

The main or primary cooling chamber C is enclosed or defined by a vertical housing 21 (Fig. 1) which near its top end is provided with a can body discharge opening 22 and near its bottom end with a similar entrance or inlet opening (not shown). This housing 21 rests on and is secured to a base frame 23. Can bodies A having freshly soldered side seams B are fed into the cooling chamber C through the inlet opening at the bottom of the housing 21, from any suitable source of supply such as the can body making machine which form the bodies and solders the side seams. The bodies A are disposed in a horizontal position, i.e. on their side with the side seam located under the bodies when introduced into the cooling chamber C.

Within the cooling chamber C, the bodies A are received in a vertically disposed rotating cooling drum 25 which is similar to the cooling drum disclosed in United States Patent 2,578,733 issued December 18, 1951, to R. E. J. Nordquist et al. on Article Conveying Machine. Feeding of the can bodies A to and from this cooling drum 25 preferably is effected in the same manner as that disclosed in the above Nordquist Patent 2,578,733.

The cooling drum 25 upon receiving a can body A carries it upwardly, along a helical path of travel to the top of the housing 21 where it is discharged through the outlet opening 22. For this purpose the drum 25 comprises two vertically and axially spaced discs 27, 28 (Fig. 1) connected by a long vertical hub 29 surrounding and keyed to a vertical drive shaft 31 having its upper end journaled in a bearing 32 in the top of the housing 21 and having its lower end journaled in a bearing 33 in the base frame 23. The vertical drive shaft 31 is rotated continuously in any suitable manner.

Between the discs 27, 28 a plurality of vertically disposed endless chain conveyors 35 are spaced around the peripheries of the discs, and operate over drive sprockets 36 and idler sprockets 37 mounted on respective short shafts 38, 39 journaled in bearing brackets 41 attached to the discs. The sprocket drive shafts 38 are rotated by bevel gears 43 which are mounted on the shafts and which mesh with bevel gears 44 carried on vertical gear shafts 46 journaled in bearings 45 in the lower discs 27. Each vertical gear shaft 46 carries and is rotated by a spur gear 47. The spur gears 47 on all of the vertical gear shafts 46 mesh with and rotate around a common stationary ring gear 48 which surrounds the vertical drum shaft 31 and which is secured to the shaft bearing 33.

Hence as the cooling drum 25 is rotated by its vertical shaft 31, the spur gears 47 of the conveyors 35 revolve around the ring gear 48 and thus actuate the conveyors 35 in the proper direction. The conveyors 35 are disposed with their inner runs adjacent the drum hub 29 and their outer runs facing outwardly and traveling upwardly toward the top of the housing 21.

The can bodies A introduced into the cooling chamber C are received on and carried upwardly on the outer runs of the conveyors 35 and thus as the drum rotates, are caused to traverse a helical path of travel from the bottom of the cooling chamber to the top of the chamber before being discharged. For this purpose, the conveyors 35 are provided with a plurality of permanent magnetic support dogs 51 connected to and spaced along each of the conveyors for carrying the can bodies A in a horizontal position with their side seams B under the bodies as shown in Fig. 2. The speed of the conveyors 35 and their rotation around the drum driving shaft 31 is such that each support dog 51 as it moves upwardly along the outer run of its conveyor, travels through a helical path to carry its can body through an identical path.

As each can body A moves up through the cooling chamber C it passes a spraying mechanism which is disposed adjacent the path of travel of the bodies. This spraying mechanism is disposed in the auxiliary cooling chamber D which is enclosed by a casing 53 (Figs. 1 and 5) mounted on the base frame 23 and having one side open and communicating with a similarly open portion of the housing 21.

The spraying mechanism comprises in part a rotatable turret 54 (Figs. 1 and 2) preferably formed on a column 55 for rotation on an anti-friction thrust bearing 56 seated on the base frame 23. The column 55 is rotated continuously in time with and in a direction opposite to that of the cooling drum 25, by a gear 57 which is mounted on the lower end of the column and which meshes with a driving gear 58 on the lower end of the cooling drum drive shaft 31.

The turret 54 carries a plurality of can body carrier heads 61 (Figs. 2, 5 and 8) which travel with the turret into tangential position with the can bodies A on the cooling drum 25. As each carrier head 61 passes the drum, it picks off an unsprayed can body A from one of the magnet supports 51 of the cooling drum, and simultaneously replaces a sprayed can body onto the empty magnet support 51 just above the picked off can, which empty support was created by the picking off of a previous body to be sprayed and the moving up of the empty support into its present position through rotation of the drum and operation of the particular conveyor 35.

The picked-off can body to be sprayed is carried along a curved path of travel through a full 360 degree revolution of the turret, during which time it is tilted endwise through 90 degrees to turn it from a horizontal position to a vertical position for spraying and then after spraying is tilted endwise further through another 90 degrees to return it to its horizontal position but with the sprayed side seam on top of the body instead of at the bottom as when picked off. It is in this inverted horizontal position and at a higher level that it is returned to the cooling drum for further cooling.

There are twelve carrier heads 61 (see Fig. 5) which effect this movement of the can bodies and they are spaced equally around the turret 54. Each carrier head 61 preferably comprises a pair of normally vertical, hollow slide blocks 63 (Figs. 2 and 8) having laterally projecting tongues 64 which are disposed in a common slideway 65 (Fig. 10) in a normally vertical, rotatable holder 66. Each holder 66 is provided with a trunnion 67 which is journaled for rotation in a bearing 68 (Figs. 2 and 8) on a radial web 69 (Fig. 2) which extends up from and forms a part of the turret 54. There are twelve bearings 68 on the turret 54, one for each carrier head 61.

The slide blocks 63 in the holder 66 are maintained in endwise spaced relation by a compression spring 70 (Fig. 8) which is interposed between them. The spring 70 normally holds the blocks yieldably against retainer plates 71 secured to the ends of the holder 66 for a purpose to be hereinafter explained.

Each slide block 63 carries a non-magnetic front plate 73 (Figs. 8 and 11) which in turn carries a pair of electro-magnet pole pieces 74 projecting outwardly from the plate and having shallow V-shaped faces for engagement against the side of a can body A in a horizontal position in the cooling drum 25. The pole pieces have lugs 75 which extend back through the plate and which engage between them an electromagnet coil 76 disposed in the hollow slide blocks 63. There is one coil 76 in each slide block.

One side of each of the magnet coils 76 is grounded by wires 77 (Fig. 8) to the slide blocks 63. The opposite side of one of the magnet coils 76 is connected to a wire 78 and the other coil 76 to a wire 79 which wires extend through a bore in the trunnion 67 and connect with a pair of collector rings 81, 82 respectively, set in an insulation insert 83 (Fig. 10) in the trunnion. The collector ring 81 rides on a brush 85 which is connected by a wire 86 to a movable brush 87 (Figs. 3 and 8) fixed to a slide 88 carried in a bracket 89 on each of the turret webs 69. The slide is actuated by cam action as will be hereinafter explained.

The movable brush 87 engages against a stationary collector ring 91 attached to and insulated from a stationary barrel cam 92 secured to a stationary post 93 (see Figs. 1 and 2) which extends down through the column 55 and is anchored at its lower end to a bracket 94 attached to the base frame 23. The collector ring 91 is connected by wires 95, 96 to a source of electric current such as a generator 97. The generator is grounded by a wire 98 to a part of the mechanism such as the barrel cam 92.

Electric current from the generator serves both electromagnet coils 76 of each head 61 but one magnet coil 76 is served only through the collector rings 81, 91. The other magnet coil is served separately through its collector ring 82 which rides against a brush 101 (Fig. 8) which is connected by a wire 102 to a movable brush 103 on a slide 104 similar to the slide 88 (Fig. 3) and located in a bracket 105 attached to each web 69 of the turret 54. The slide 104 is actuated through cam action as will be hereinafter explained. The brush 103 on the slide rides on a stationary collector ring 107 which is insulated from and attached to a stationary face cam 108 which is connected by depending webs to the barrel cam 92 secured to the stationary post 93. The collector ring 107 is connected by a wire 109 to the generator wire 96.

Through this electric connection of the magnet coils 76 to the generator 97, provision is made to break the connection on the magnet coils alternately after each revolution around the column 55, i.e. after each spraying cycle. The lower magnet coil 76 of each head 61 is magnetized when the pole pieces 74 of this coil moves into register with a can body to be picked off the cooling drum 25. Simultaneously with the action, the upper magnet coil 76 in the same head 61 is demagnetized to release the can body which it held and carried through a spraying cycle and is now returning it to the cooling drum. This switching of the electric current from one magnet coil 76 to the other is effected through a shifting of their brushes 87, 103, relative to their collector rings 91, 107.

The movement of the brushes 87, 103 preferably is caused by X shaped stationary cams 111, 112 (see also Fig. 4) which are secured to the barrel cam 92 and the face cam 108 and which are traversed by cam rollers 114 on the slides 88, 104. The X cams 111, 112 are located adjacent the point of tangency of the paths of travel of the can bodies on the cooling drum 25 and the carrier heads 61 of the spraying mechanism. The lower X cam 111 is arranged to shift the brush 87 onto the collector ring 91 when the lower magnet coil 76 (as viewed in Fig. 8) is at the bottom of the head 61 and is to be magnetized to pick up a can body for spraying and to shift the brush off the collector ring when this magnet coil rotates into a position at the top of the carrier head 61 after a spraying cycle to demagnetize the coil and release the sprayed can body at the higher level to the cooling drum 25.

In a similar manner the upper X cam 112 for the upper magnet coil 76 (as viewed in Fig. 8) is arranged to shift the brush 103 off the collector ring 107 when this upper magnet coil 76 is at the top of the head 61 and is to be demagnetized to release a sprayed can body to the cooling drum 25 and to shift the brush onto the collector ring when this magnet coil rotates into a position at the bottom of the carrier head 61 to be magnetized to pick up a can body for spraying.

This reversal of the positions of the magnet coils 76 of each carrier head 61 as the head travels around a spraying cycle is effected by a rotating action of the head by the stationary barrel cam 92. For this purpose, the trunnion 67 of each head 61 carries a swivel arm 115 (Figs. 8 and 9) which is parallel with the slideway 65 in the holder 66 and which carries a pair of cam rollers 116, 117 equally spaced from the axis of the trunnion. The upper cam roller 116 (as viewed in Fig. 8) on one pass around the spraying cycle traverses a short cam groove 118 in the periphery of the barrel cam 92. The groove 118 is disposed adjacent the point of tangency of the path of travel of the can bodies in the cooling drum 25 and the spraying mechanism. Adjacent this grooved portion of the cam 92, the cam is formed with a projecting tongue 121 (Figs. 7, 8 and 9) which engages in a groove 122 (Fig. 9) in the swivel arm 115 and retains the arm in a vertical position during the transfer of can bodies between the cooling drum 25 and the spraying carrier heads 61. On either side of this tongue 121, the lower run of the cam groove 118 terminates in sharp points 123, 124 (Fig. 7) and the upper run of the groove continues as a level open track 125.

Figures 4, 5, 6:
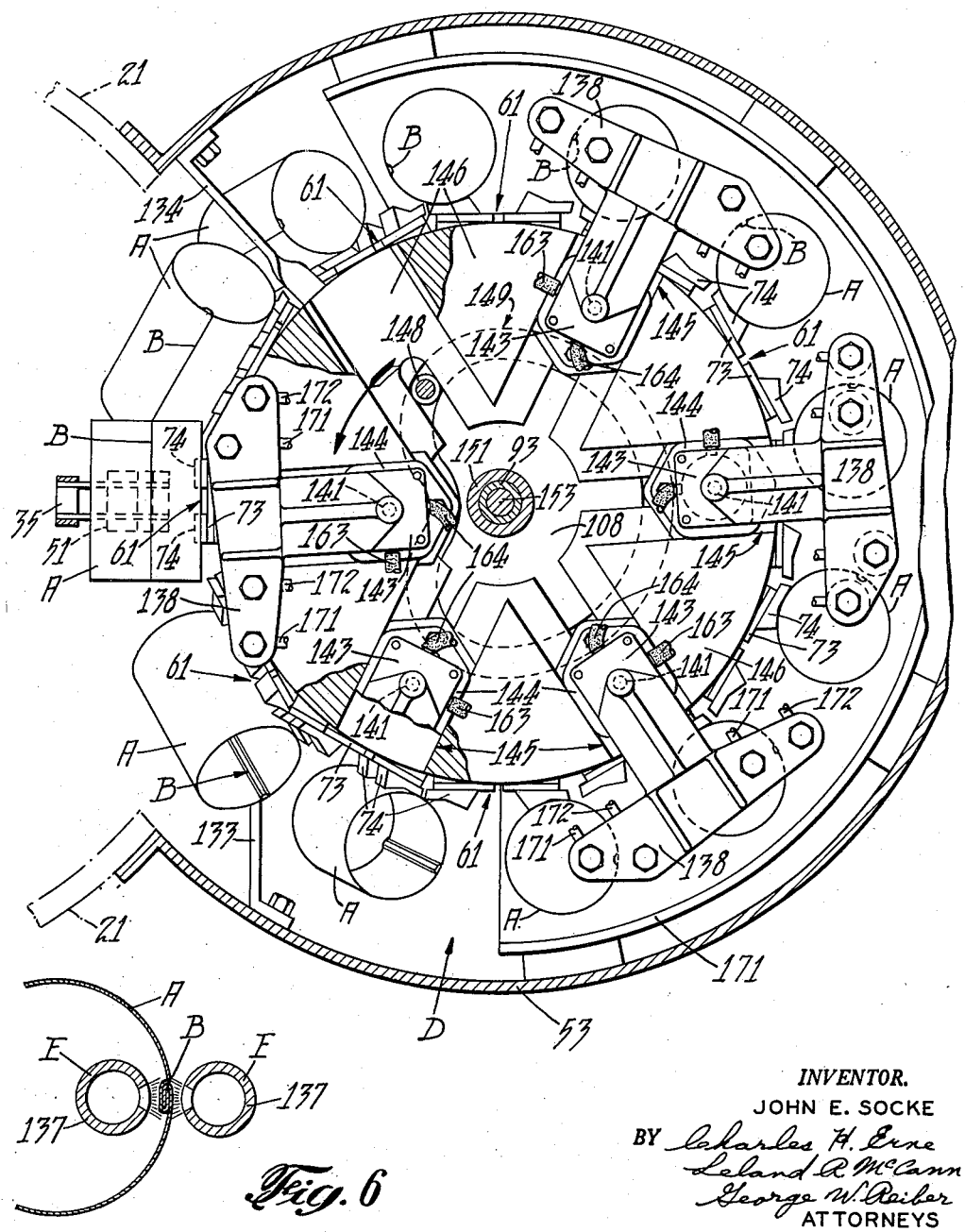
Fig. 4 is an enlarged inverted plan view of a cam detail shown in Fig. 2.
Fig. 5 is an enlarged top plan sectional view taken substantially along the broken line 5—5 in Fig. 2, with parts broken away.
Fig. 6 is an enlarged sectional view taken substantially along the line 6—6 in Fig. 2, with parts broken away.

Hence, since the swivel arm 115 has a fixed point at its axis, its travel around the barrel cam 92 with its carrier head 61, causes the upper cam roller 116 to traverse the cam groove 118 (at the left as viewed in Fig. 7) with a retarding action which turns the swivel arm 115 in a counterclockwise direction (Fig. 7) as the roller approaches the sharp point 123 of the lower run of the groove, with the result that both rollers 116, 117 are rotated into a horizontal position riding against the cam track 125 as shown in Fig. 7. This action turns the swivel arm 90 degrees from a vertical position into a horizontal position, with the result that the can body A gripped by the lower magnet coil 76 in its head 61 is rotated from a picked off horizontal position to a vertical spraying position as shown in Figs. 2 and 5. It is while the can body is in this vertical position that the side seam B is sprayed as will be hereinafter explained.

After spraying of the side seam, the can body A continues its counterclockwise rotation through another angle of 90 degrees from its vertical position to a return horizontal position but with the side seam on top as hereinbefore mentioned. This is brought about by the leading cam roller 117 now entering into the opposite end of the cam groove 118 at the sharp point 124. Permanent magnets 127 (see Figs. 7 and 13) inserted in the cam 92 adjacent the upper run of the track 125 and cam groove 118 preferably are utilized to insure entrance of the roller 117 into the groove. Entrance of the roller into the groove swings the now lower roller 116 into vertical position under the groove and thereby completes the rotation of the head 61 and the can body A held thereon into position for discharge of the body to the cooling drum 25.

The picking off of a body from the cooling drum 25 by a magnet coil 76 is effected so as to slightly raise the body off its magnet dogs 51 before carrying it away from the drum. In a similar manner the return of the body to the magnet dogs 51 of the cooling drum is effected to bring the body into alignment with the dog and to then lower it into position on the dog. These actions preferably are effected by a pair of vertically spaced locating rollers 131, 132 (Figs. 2 and 8) which are at the point of tangency of the cooling drum 25 and the spraying mechanism and between which the slide blocks 63 of the carrier heads 61 pass as they pass this point of tangency. The rollers 131, 132 squeeze the slide blocks 63 together, endwise against the resistance of their separating spring 70 (Fig. 8) to bring about their can body handling function. These locating rollers 131, 132 are carried on brackets 133, 134 (Figs. 2 and 5) secured to the auxiliary cooling housing 53.

Spraying of a can body side seam B while the can body is in its vertical position as mentioned hereinbefore is effected by the spray heads or nozzles E (Figs. 1, 2 and 6). There are two of these nozzles E for each carrier head 61 and they comprise vertically disposed and vertically movable spaced and parallel tubes 136 having at their lower ends spray head nozzles 137 for spraying the outside and the inside faces of the side seam simultaneously as shown in Fig. 6. The two tubes 136 for each carrier head 61 are located above the head in alignment with the side seam B for straddling the seam when the can body is in its vertical position. At their upper ends the two tubes are secured to a bracket 138. Each bracket 138 carries four tubes 136 for two adjacent heads 61, there being twelve heads 61 and six brackets 138 so that two can bodies on two adjacent heads 61 are sprayed at the same time.

The bracket 138 is mounted on a vertically movable piston rod 141 (Fig. 2) having a piston 142 which operates in an air or other fluid medium cylinder 143. The cylinders 143 are mounted on individual horizontal slides 144 which operate in radial slideways 145 (see Fig. 5) formed in a horizontal table 146 attached to and rotating with the turret webs 69. The slides 144 are movable radially to shift the cylinders 143 and the tubes 136 inwardly toward the axis of the turret column 55 as they approach the cooling drum 25 so as to clear the drum without interference. This shifting of the slides 144 at this point in their travel with the turret 54 is effected by a cam roller 148 (Fig. 2) which is attached to each slide and which operates in a cam groove 149 in the stationary face cam 108 hereinbefore mentioned.

The spray tubes 136 and their nozzles 137 are normally held above the path of travel of the can bodies A moving through the spraying mechanism and are lowered to a position adjacent the side seam on opposite sides thereof when the body is in a vertical position as hereinbefore mentioned. The tubes are then drawn up and while the nozzles 137 traverse the side seam on this up stroke, they project an atomized fluid coating substance horizontally against the seam.

This vertical movement of the spray tubes 136 is effected at the proper time, preferably by compressed air introduced into the cylinders 143. The timing is effected by a rotary valve which comprises a stationary valve member 151 (Figs. 2 and 12) carried on the upper end of the stationary post 93 and a rotatable valve member 152 which seats against the stationary valve member 151. The rotatable valve member 152 is carried on the upper end of a rotatable shaft 153 which extends down through the stationary post 93 and at its lower end carries a gear 154 (Fig. 1) which meshes with and is driven by a gear 155 formed integrally with the gear 58 on the cooling drum drive shaft 31.

The upper face of the stationary valve member 151 is formed with a circular groove 157 which extends around the axis of the shaft 153 in concentricity therewith through an angle of approximately 300 degrees as shown in Fig. 12. This groove 157 is connected to a suitable source of compressed air. Between the ends of the groove 157 there is provided a short vent groove 158 (Fig. 12) which is connected in any suitable manner to the outside atmosphere.

Adjacent the vent groove 158 there is provided an air supply groove 159 of substantially the same length as the vent groove 158 and this groove 159 is connected to the source of compressed air. Between the ends of this supply groove 159 there is provided a long curved vent groove 161 which is connected to the outside atmosphere.

For cooperation with these grooves, the upper or movable valve member 152 is provided with a pair of ports which vertically align with the grooves and which are connected by flexible pipes 163, 164 to the bottom and top of the cylinder 143. There is a set of ports and pipes for each of the six cylinders 143. The port of the lower pipe 163 aligns with outer grooves 157, 158 as shown in Fig. 12 while the port of the upper pipes 164 aligns with the inner grooves 159, 161.

Hence as a cylinder 143 travels around its path with the turret 54 compressed air passes from the supply groove 157 into the pipe 163 and lower end of the cylinder 143 to hold the piston 142 and the spray tubes 136 connected therewith in an up position (as shown at the left in Fig. 2) until they reach the region in which the two can bodies A on the carrier heads 61 adjacent the cylinder are turned into a vertical position as shown in Fig. 5. At this point in the travel of the cylinder and carrier heads, the port of the lower pipe 163 rides off the supply groove 157 and rides onto the short vent groove 158. Simultaneously with this action the port of the upper pipe 164 rides off the long vent groove 161 and onto the short supply pipe 159. This action shifts the compressed air from the bottom of the cylinder to the top thereof and thus pushes the piston 142 down in the cylinder. This lowers the spray tubes 136 and spray nozzles 137 down into the vertically disposed can bodies as shown at the right in Fig. 2, the nozzles being disposed on opposite sides of the side seams of the two bodies as shown in respect to one body side seam B only in Fig. 6.

At the completion of this down stroke of the nozzles 137, the spraying of the side seams begin and the nozzles begin an up stroke along the seams toward the top of the bodies where the spraying stops while the nozzles continue on up to their original up positions as shown at the left in Fig. 2. This reversal of direction of movement of the nozzles 137 and spray tubes 136 is effected by the port of the lower pipe 163 riding off the vent groove 158 and onto the other end of the long supply groove 157 thus introducing compressed air into the bottom of the cylinder 143 to push the piston 142 up. At the same time, the port of the upper pipe 164 rides off the short supply groove 159 and onto the long vent groove 161 to vent the upper end of the cylinder. This action takes place for each cylinder as it traverses its circular path of travel with the turret 54 to insert the spray tube nozzles 137 into the two bodies A associated with each cylinder and spray their side seams on the up stroke of the nozzles.

The timing of the spraying operation is effected in the same manner as the timing of the lowering and raising of the nozzles 137. For this purpose, the upper face of the stationary valve member 151 is provided with a pair of parallel grooves 166, 167 (Fig. 12) which are concentric with the valve shaft 153 and which extend along a path coincident with the up travel of the nozzles 137 along the can body side seams B for a distance substantially equal to the length of the seams. One of these grooves 166, 167 is connected to a suitable supply of the fluid coating substance to be applied to the seams B. The other groove is connected to a suitable source of supply of compressed air or other fluid medium for atomizing and projecting the coating substance onto the seams as shown in Fig. 6.

For cooperation with these grooves 166, 167, the upper or movable valve member 152 is provided with sets of ports 168, 169 (Figs. 2 and 12). There is one set of ports 168, 169 for each spray head E and each set is connected by flexible pipes 171, 172 respectively (Figs. 2 and 5) to the two spray tubes 136 associated with each cylinder 143. Hence as each cylinder 143 advances into the position where the nozzles 137 lowered into spraying position begin their up or spraying stroke, the sets of ports 168, 169 for the spray heads E controlled by this particular cylinder advance onto and along the grooves 166, 167 and thus deliver the fluid coating substance and the atomizing medium from the nozzles 137 to the can body seams B. At the top of the seam the ports ride off the grooves 166, 167 and thereby cut off the supply of atomized fluid substance until the next spraying cycle on another pair of can bodies advanced into the same position by the same carrier heads 61 associated with this particular cylinder 143.

A drain pan 173 (Figs. 2 and 5) secured to the auxiliary housing 53 is provided under the can bodies A in the spraying region to catch excess coating substance from the spray nozzles 137 and to carry it away to any suitable place of deposit.

After the spraying operation has been completed the sprayed bodies are returned to the empty magnet supports, but at a higher level, as previously described. Continued rotation of the drum carries the bodies upwardly in a helical path of travel and delivers them into discharge position adjacent the discharge opening 22 through which the treated can bodies A are discharged in any appropriate manner.

It is thought that the invention and many of its attendant advantages will be understood from the foregoing description, and it will be apparent that various changes may be made in the form, construction and arrangement of the parts without departing from the spirit and scope of the invention or sacrificing all of its material advantages, the form hereinbefore described being merely a preferred embodiment thereof.

I claim:

1. An apparatus for conveying can bodies and for performing a spraying operation on their side seams, comprising a conveyor having spaced support dogs thereon for advancing can bodies in a predetermined position and in timed relation along a vertical path of travel, a carrier head movable along a horizontal path of travel adjacent the path of travel of said conveyor for receiving can bodies therefrom, means for actuating said conveyor and said carrier head in timed relation, a plurality of vertically spaced gripper units on said carrier head respectively for simultaneously engaging and disengaging two adjacently disposed can bodies in respect to two adjacent conveyor dogs, fixed means engageable with said carrier head during movement thereof for reversing the position of said vertically spaced gripper units, and means for actuating the lower of said vertically spaced gripper units to pick off and horizontally advance a can body from said conveyor for a side seam spraying operation thereon, said actuating means being further effective to simultaneously actuate the upper of said gripper units to release to said conveyor a previously picked-off and sprayed can body.

2. An apparatus of the character defined in claim 1 wherein said gripper units are electromagnets and wherein said means for making said units effective and ineffective comprise electric means for alternately energizing and deenergizing said electromagnet units.

3. An apparatus of the character defined in claim 1 wherein said carrier head is rotatable on its own axis and wherein said reversing means comprise means for rotating said carrier head to reverse the picking up and releasing relation of said gripper units on said head.

4. An apparatus of the character defined in claim 1 wherein said gripper units are yieldably mounted in said carrier head and wherein means are provided to move each of said gripper units relative to said head to pick off a can body from said conveyor, while simultaneously returning another can body to said conveyor.

5. An apparatus of the character defined in claim 1, wherein said gripper units are slidably mounted in side by side relation on said carrier head, and means for yieldably holding said units in separated relation, and a pair of spaced locating members disposed adjacent said conveyor for yieldable passage therebetween of said gripper units to move the latter towards one another for facilitating the removal of an untreated can body from said conveyor while simultaneously releasing a treated can body thereto.

6. An apparatus of the character defined in claim 1 having means for rotating said carrier head on a vertical axis, means for restraining said head against axial rotation during pick-off and release of can bodies from and to said conveyor, and wherein said fixed means engageable with said carrier head during rotative movement thereof on said vertical axis serve to intermittently rotate the head on a horizontal axis first to turn the gripped can body thereon from horizontal to vertical position for a spraying operation on its side seam and thereafter to return the sprayed can body to a horizontal position in reverse to that it formerly occupied on said conveyor and prior to the release of said sprayed can body thereto.

7. An apparatus of the character defined in claim 1 wherein means for performing said can body spraying operation are disposed adjacent the path of travel of said carrier head and remote from said conveyor.

8. An apparatus of the character defined in claim 7 wherein said spraying means comprises a spraying nozzle having means for moving the same along the side seam of said picked off can body to perform said spraying operation thereon.

9. An apparatus of the character defined in claim 8 wherein a pair of said spraying nozzles disposed in spaced relation for spraying opposed faces of said side seam, and wherein means are provided for moving both of said spraying nozzles simultaneously to effect said spraying operation.

10. An apparatus of the character defined in claim 1 wherein said carrier head is carried by a turret rotatable on a vertical axis disposed adjacent said conveyor.

11. An apparatus of the character defined in claim 1 wherein said conveyor and said carrier head are disposed in a cooling chamber defined by an enclosing housing.

12. An apparatus of the character defined in claim 1 wherein said conveyor comprises a vertically disposed rotatable cooling drum carrying a plurality of endless conveyors each having can body support dogs thereon, and wherein means are provided for rotating said drum and said conveyors in unison in a predetermined direction to cause said support dogs and the can bodies carried thereby to ascend along a helical path of travel, and wherein a plurality of said carrier heads are mounted on a rotatable turret disposed in tangential relation to said helical path of can body travel for successively picking can bodies off said conveyor support dogs for travel with said turret for said side seam spraying operation and for successive return of the sprayed can bodies to the empty support dogs of said conveyor.

13. An apparatus for conveying can bodies and for performing a spraying operation on said side seams, comprising a conveyor having spaced support dogs thereon for advancing can bodies in a predetermined position and in time relation along a predetermined path of travel, a carrier head movable along another predetermined path of travel adjacent the path of travel of said conveyor for transferring can bodies therebetween at a locality of tangency of said paths of travel, means for actuating said conveyor and said carrier head in timed relation, a plurality of spaced gripper units on said carrier head respectively for simultaneously engaging and disengaging two adjacently disposed can bodies in respect to two adjacent conveyor dogs, fixed means engageable with said carrier head during movement thereof for reversing the position of said spaced gripper units, and means for actuating one of said spaced gripper units to pick off and advance a can body from said conveyor for a side seam spraying operation thereon, said actuating means being further effective to simultaneously actuate another of said gripper units to release to said conveyor a previously picked-off and sprayed can body.

References Cited in the file of this patent

UNITED STATES PATENTS

| | | |
|---|---|---|
| 2,103,270 | Murch | Dec. 28, 1937 |
| 2,166,598 | Kronquest | July 18, 1939 |
| 2,255,615 | Frankel | Sept. 9, 1941 |
| 2,335,239 | Gradfelter et al. | Nov. 30, 1943 |
| 2,383,023 | Sykes et al. | Aug. 21, 1945 |
| 2,499,422 | Schmidt | Mar. 7, 1950 |
| 2,500,492 | Henriques | Mar. 14, 1950 |
| 2,561,404 | Nordquist | July 24, 1951 |
| 2,578,733 | Nordquist et al. | Dec. 18, 1951 |
| 2,643,778 | Socke | June 30, 1953 |
| 2,693,782 | Moore | Nov. 9, 1954 |
| 2,732,925 | Pechy | Jan. 31, 1956 |
| 2,770,349 | Nordquist | Nov. 13, 1956 |